United States Patent [11] 3,557,343

[72] Inventors Per Gunnar Brynge;
 O. Arne Andersson; Hans Ove Nilson,
 Huskvarna, Sweden
[21] Appl. No. 741,103
[22] Filed June 28, 1968
[45] Patented Jan. 19, 1971
[73] Assignee Husqvarna Vapenfabriks Aktiebolag
 Huskvarna, Sweden
[32] Priority June 29, 1967
[33] Sweden
[31] No. 9633/67

[54] CONTROL EQUIPMENT OF HEATING DEVICES
 3 Claims, 3 Drawing Figs.
[52] U.S. Cl. .................................................... 219/510
[51] Int. Cl. ...................................................... H05b 1/02
[50] Field of Search ........................................... 219/494,
 510; 323/69; 337/360, 307, 397

[56] References Cited
UNITED STATES PATENTS
| | | | |
|---|---|---|---|
| 2,209,767 | 7/1940 | Dillman | 337/307 |
| 2,474,369 | 6/1949 | Ray | 337/307 |
| 2,668,216 | 2/1954 | Tidd | 337/397 |
| 3,188,553 | 6/1965 | Eurenius | 323/69 |
| 3,330,940 | 7/1967 | Hocker | 219/510 |

Primary Examiner—Bernard A. Gilheany
Assistant Examiner—F. E. Bell
Attorney—William W. Downing, Jr.

ABSTRACT: A regulating device in heating apparatus for regulating the power by frequent on and off switching including a switch means controlled concurrently by a first sensor sensing the temperature representative for the apparatus, and by a second sensor, sensing the temperature of the air in a room, which the apparatus is to heat.

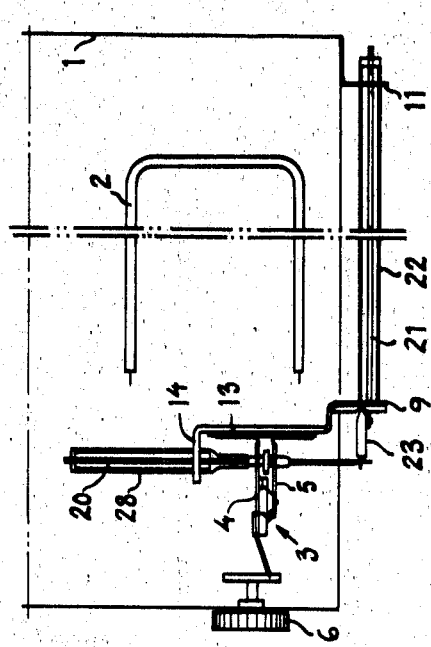
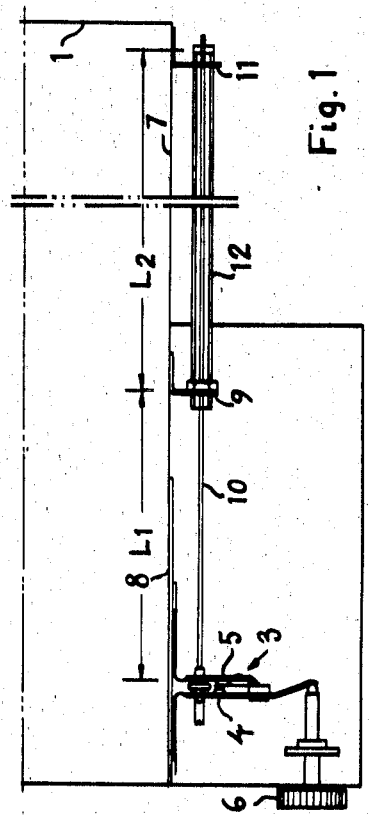
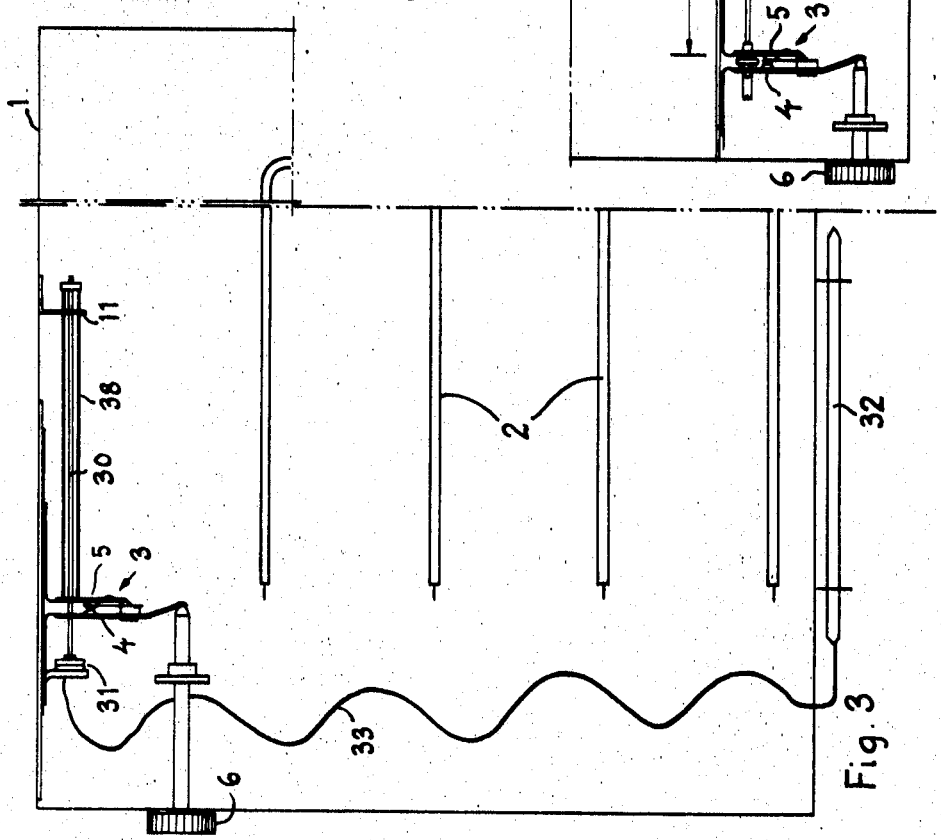

CONTROL EQUIPMENT OF HEATING DEVICES

The invention relates to a regulating device in heating apparatus, especially electrical room-heating equipment having a small heating capacity, such as heating panels. A thermostat is usually used to regulate the adjusted power of such room-heating equipment and switches the system off or on according to the setting. The apparatus usually has time to cool down to room temperature during the off-periods, which creates a disadvantage from the comfort point of view, in the form of cold-air currents from the windows in the room, and a loss of heat radiation which could have compensated for the cold-air emanating from the windows. Different solutions solutions have been put forward to eliminate these disadvantages:

a. The apparatus is supplied with several heating elements, one of which is not regulated but remains constantly connected. The elements therefore have a slightly higher temperature compared with the room even during the off-periods. The on/off type of regulation remains although the discomfort caused during the off-period is reduced in proportion to the amount of power given off by the constantly connected element. When the heat given off constantly by the element exceeds the warmth required, e.g. because of strong sunshine or another source of 'free' warmth and during the Spring and Autumn, the apparatus has to be turned off manually.

b. Dependent on the outside temperature the voltage passed to the apparatus is varied in for example three steps. In this way the power generated by the apparatus is adapted to the degree of warmth required, and the off-periods are shorter when the warmth required is less than the maximum effect of the apparatus. The off-periods still occur, although they are shorter. The apparatus provided for this solution is costly.

c. Variable regulation of the current strength through a semiconductor. The apparatus designed for this method is also too costly to allow individual regulation.

The aforementioned disadvantages are eliminated by means of the present invention which makes possible individual stepwise and automatic regulation of the power of electrical room-heating apparatus and which can also be used to advantage in other heating apparatus, to achieve power regulation by relatively simple and inexpensive means.

The invention will now be described with reference to the accompanying drawing in which FIGS. 1 to 3 illustrate three different applications of the invention to an electric surface-heated panel radiator.

The panel radiator consists of a metal casing 1 for two U-shaped series connected resistance heating elements 2 which, via a thermostatic circuit breaker 3 and a manual circuit breaker (not shown), are capable of being connectable to the electric mains (a phase conductor and an earth). The circuit breaker 3 can be a snap switch comprising two resilient contact arms 4, 5 of which contact arm 4 is adjustable by means of a knob 6 mounted on the casing and the contact arm 5 is connected with a mechanical temperature sensing means.

In the embodiment shown in FIG. 1 the contact arms 4, 5 are fixed on the under side of the bottom 7 of the casing 1, the section 8 of length $L_1$ of which between the contact arm 5 and an attachment member 9 on the wall 7 can be considered to have a temperature representative for the radiator. The aforementioned temperature sensor comprises a straight invar rod 10, connected at one end to contact arm 5 and connected at the other end to the one end of an aluminum tube or pair of rods, said end being capable of moving in a holder 11 on the wall 7 and the other of said rods or tube 12 being attached to the bracket 9 and extend somewhat outside the casing 1, and are sensitive to the temperature of the room and have the effective length $L_2$.

The parts 3—6, 8 and 10 form a thermostat having setting device 10 which actuates the contact arm 5. If part 8 at full output has the temperature $t_1$ and at zero output assumes the ambient temperature $t_2$, the desired value of the thermostat $t_b$ can be varied between $t_2$ and $t_1$. When $t_1 = 70°$ C. and the lowest value of $t_2 = 5°$ C., the regulating range of the thermostat is 65° C. It should be possible to regulate the temperature $t_2$ within the temperature range of 5—35° C. According to the invention the desired value of the thermostat is automatically adjusted in response to the temperature of the surrounding air, due to the fact that the movement of the setting device 10 at changes of temperature is the algebraic total of the changes in length of the parts 8 and 12. The movement of the sensor can be adjusted so that a change in $t_2$ of, for example, 2° C. brings about a change in the desired value of the thermostat, equivalent to the difference between zero output and full output, i.e. according to the above assumption, 65° C.

The proportional range for the temperature of the room is consequently 2° C. The relation $L_2 : L_1$ determines the width of the proportional range and $L_1$ determines the accuracy of the regulation of the temperature $t_1$.

The three embodiments have the same function. According to FIG. 2 the switch 3 is fixed on the attachment mounting 9 forming a cross wall 13 in the casing and intended to support a temperature sensing means 22 similar to the room temperature sensor 12 with holder 11, and placed under the casing 1, and a guide structure 14 for a similar, but vertical sensor 28, which is actuatably connected with the contact arm 5 by a temperature $t_1$ representative for the radiator. Two invar rods 20, 21 are so connected, at their one end with sensors 28 and 22, respectively and at their other end with each other by a mechanical movement transmitting device 23 that movement of the setting of the sensor 28, which also serves as a thermostat setting device in this instance, is dependent on the change of length of the sensors in response to changes of temperature.

According to FIG. 3 the switch 3 is fixed on the underside of the top of the casing. The contact arm 5 is connected with the end of an aluminum or brass tube or rod pair 38, which sense or senses a temperature $t_1$ representative for the radiator and which at its other end is slidable in the holder 11 and connected with the one end of an invar or steel rod 30, whose other end is connected with a diaphragm in a stationary box 31. This is connected by a capillary tube 33 to a priorly known bulb 32, attached under and behind the casing 1, in order to sense the temperature $t_2$ of the surrounding air and, upon changes in temperature of the air, to displace the rod 30 longitudinally by means of the box 31, so that even in this instance the setting movements caused by the sensors 30, 32 are superimposed and the desired value of the thermostat is automatically adjusted, responsive to the temperature of the surrounding air.

The two sensors in the described embodiments are assumed to be connected in series. They can even be connected in parallel e.g. to the ends of a swing bar which between its ends is connected to the switch 3, or more generally expressed, the power regulating means of the apparatus.

The invention can even be used in room heating equipment having small heat inertia, e.g. quick hot plates and electrical kitchen ovens having a relatively thin metal casing. In the former case one of the sensors can be adapted to react to the change in dimension of the plate responsive to the temperature and the other sensor can be a bulb in contact with the bottom of the cooking utensil. In the latter case the two sensors can register the temperature of the oven casing and the atmosphere in the oven. The invention can be used in a hot-water boiler including thermostatically controlled electric elements and room radiators connected to the tank in which case the two sensors can be adapted to register the temperature of the water in the tank and the temperature of the rooms. In this way one achieves a continuous regulation of the temperature of the rooms without using sa servomotor driven shunt valve.

The invention can also be used in combustion heating equipment having power regulating mans e.g. in the form of a draught or fuel supplying control valve. The invention can be applied in every case where it is desirable to regulate two temperatures in a certain relation to each other, e.g. when regulating a refrigerating chamber.

We claim:

1. A regulating device in heating apparatus comprising a casing, switch means for regulating the power of said apparatus, a first sensor which senses a temperature representative for said apparatus and a second sensor which senses the temperature in a room which said apparatus is to heat, wherein said first sensor is constituted of a rod and a tube responsive to temperature changes and means responsive to length changes of said rod relatively to said tube and acting on said switch means, said second sensor constituted of a bulb element filled of a temperature responsive medium, a pressure responsive means in operative connection with said first sensor and a capillary tube connecting said bulb element and pressure responsive means, characterized in that said switch means is secured to said casing by resilient means and a setting knob is arranged in the device to move, on setting said knob to a predetermined room temperature, said switch means into a position responsive to the setting relatively to said first sensor.

2. A regulating device in heating apparatus comprising a casing, switch means for regulating the power of said apparatus, a first sensor which senses a temperature representative for said apparatus and a second sensor which senses the temperature in a room which said apparatus is to heat, wherein said firs sensor is constituted of a frame and a rod responsive to temperature changes and first means responsive to length changes of said rod relatively to said frame, said second sensor constituted of another frame and rod responsive to temperature changes and second means responsive to length changes of the rod relatively to its frame in said second sensor, said first and second means responsive to length changes operatively connected in parallel to said switch means, characterized in that said switch means is secured to said casing by resilient means and a setting knob is arranged in the device to move, on setting said knob to a predetermined room temperature, said switch means into a position responsive to the setting relatively to said means responsive to length changes.

3. A regulating device in heating apparatus comprising a casing surrounding said apparatus, switch means for regulating the power of said apparatus, a first sensor which senses a temperature representative for said apparatus and a second sensor which senses the temperature in a room which is to be heated, wherein said first sensor is constituted of a part of said casing subjected to temperature changes in said apparatus, a rod and means responsive to length changes of said part relatively to said rod and acting on said switch means, said second sensor constituted of a frame responsive to temperature changes outside said casing and operatively connected to said first sensor, characterized in that said switch means is secured to said casing by resilient means and a setting know is arranged in the device to move, on setting said knob to a predetermined room temperature, said switch means into a position responsive to the setting relatively to said means responsive to length changes.